United States Patent
Arora et al.

(10) Patent No.: US 12,307,186 B1
(45) Date of Patent: May 20, 2025

(54) LAUNCH OFF SHIFT PROCESS

(71) Applicant: Cadence Design Systems, Inc., San Jose, CA (US)

(72) Inventors: Puneet Arora, Uttar Pradesh (IN); Subhasish Mukherjee, Uttar Pradesh (IN); Sarthak Singhal, Uttar Pradesh (IN); Christos Papameletis, Apex, NC (US); Brian Edward Foutz, Charlottesville, VA (US); Krishna Vijaya Chakravadhanula, Vestal, NY (US)

(73) Assignee: Cadence Design Systems, Inc., San Jose, CA (US)

( * ) Notice: Subject to any disclaimer, the term of this patent is extended or adjusted under 35 U.S.C. 154(b) by 470 days.

(21) Appl. No.: 17/737,221

(22) Filed: May 5, 2022

(51) Int. Cl.
*G06F 30/396* (2020.01)
*G06F 30/30* (2020.01)
*G06F 30/3312* (2020.01)
*G06F 30/333* (2020.01)
*G06F 30/337* (2020.01)
*G06F 115/02* (2020.01)
*G06F 119/12* (2020.01)

(52) U.S. Cl.
CPC ........ *G06F 30/396* (2020.01); *G06F 30/3312* (2020.01); *G06F 30/333* (2020.01); *G06F 30/337* (2020.01); *G06F 30/30* (2020.01); *G06F 2115/02* (2020.01); *G06F 2119/12* (2020.01)

(58) Field of Classification Search
None
See application file for complete search history.

(56) References Cited

U.S. PATENT DOCUMENTS

| | | | | |
|---|---|---|---|---|
| 7,231,563 B2 * | 6/2007 | Vinke | ................ | G11C 29/1201 |
| | | | | 714/730 |
| 7,266,743 B2 * | 9/2007 | Athavale | ........ | G01R 31/318594 |
| | | | | 714/733 |
| 9,709,629 B2 * | 7/2017 | Sofer | ............ | G01R 31/318575 |
| 10,151,797 B2 * | 12/2018 | Srinivasan | ..... | G01R 31/318541 |
| 11,714,131 B1 * | 8/2023 | Srinivasan | ..... | G01R 31/318552 |
| | | | | 714/726 |

* cited by examiner

*Primary Examiner* — Leigh M Garbowski
(74) *Attorney, Agent, or Firm* — Mark H. Whittenberger; Holland & Knight LLP

(57) ABSTRACT

Embodiments included herein are directed towards a launch off shift circuit module. Embodiments included a first flip-flop configured to receive a clock signal and a scan enable signal. Embodiments may further include a combinational logic circuit configured to receive an input from the first flip-flop and a launch off shift mode signal. The first flip-flop and the combinational logic circuit may be located inside a launch off shift module boundary.

18 Claims, 22 Drawing Sheets

Case 1: 'se' active high, 'y' ('se' pin of flop) active high

| se | ff_out,los_mode (0,0) | ff_out,los_mode (0,1) | ff_out,los_mode (1,1) | ff_out,los_mode (1,0) |
|----|----|----|----|----|
| 0 | 0 | 0 | 1 | 0 |
| 1 | 1 | 1 | 1 | 1 |

This leads to 'se / (ff_out & los_mode)'

FIG. 7

Case 2: 'se' active low, 'y' ('se' pin of flop) active high

| se | ff_out,los_mode (0,0) | ff_out,los_mode (0,1) | ff_out,los_mode (1,1) | ff_out,los_mode (1,0) |
|---|---|---|---|---|
| 0 | 1 | 1 | 1 | 1 |
| 1 | 0 | 1 | 0 | 0 |

This leads to 'Ise / (!(ff_out & los_mode)'

FIG. 8

Case 3: 'se' active high, 'y' ('se' pin of flop) active low

| se | ff_out,los_mode (0,0) | ff_out,los_mode (0,1) | ff_out,los_mode (1,1) | ff_out,los_mode (1,0) |
|---|---|---|---|---|
| 0 | 1 | 1 | 0 | 1 |
| 1 | 0 | 0 | 0 | 0 |

This leads to '!se & (!(ff_out | !los_mode)' which is '!se & (!(ff_out & los_mode)'

FIG. 9

Case 4: 'se' active low, 'y' ('se' pin of flop) active low

| se | ff_out_los_mode (0,0) | ff_out_los_mode (0,1) | ff_out_los_mode (1,1) | ff_out_los_mode (1,0) |
|---|---|---|---|---|
| 0 | 0 | 0 | 0 | 0 |
| 1 | 1 | 0 | 1 | 1 |

This leads to '*se* & *(ff_out / !los_mode)*'

FIG. 10

LAUNCH OFF SHIFT PROCESS

BACKGROUND

At-speed scan testing is becoming more and more popular in the semiconductor industry, as the relevance of delay-induced defects increases with complementary metal-oxide-semiconductor ("CMOS") process scaling and consequent integrated circuit ("IC") complexity growth. Launch off Shift ("LoS") is a methodology that is used for transition fault testing (using at-speed scan testing) in system-on-a-chip ("SoC") designs.

SUMMARY

In one or more embodiments of the present disclosure, a launch off shift circuit module is provided. Embodiments include a first flip-flop configured to receive a clock signal and a scan enable signal. Embodiments may further include combinational logic configured to receive an input from the first flip-flop and a launch off shift mode signal. The first flip-flop and the combinational logic may be located inside a launch off shift module boundary.

One or more of the following features may be included. In some embodiments, a second flip-flop configured to receive the clock signal and scan enable signal and to provide an output to the first flip-flop may be provided. Embodiments may include at least one module configured to analyze a clock tree and to identify a minimal number of required flip-flops and/or at least one module configured to identify a location for placement of the module regardless of a polarity of the first flip-flop. A common module may be used for both a positive edge flip-flop and a negative edge flip-flop. The module may be inserted at a power domain aware location. The power domain aware location may include a clock tap point. The power domain aware location may include a scan enable tap point. Embodiments may include a storage device configured to store and/or reuse the module.

In one or more embodiments of the present disclosure a launch off shift method is provided. The method may include receiving a clock signal and a scan enable signal at a first flip-flop. The method may further include receiving an input from the first flip-flop and a launch off shift mode signal at combinational logic, wherein the first flip-flop and the combinational logic are located inside a launch off shift module boundary.

One or more of the following features may be included. In some embodiments, the method may include receiving the clock signal and the scan enable signal at a second flip-flop and providing an output to the first flip-flop. The method may also include analyzing a clock tree and identifying a minimal number of required flip-flops. The method may further include identifying a location for placement of the module regardless of a polarity of the first flip-flop. A common module may be used for both a positive edge flip-flop and a negative edge flip-flop. The method may include inserting the module at a power domain aware location. The power domain aware location may include a clock tap point. The power domain aware location may include a scan enable tap point. The method may also include storing the module and/or reusing the module.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

FIGS. 7-10 show combinational logic examples according to embodiments of the present disclosure;

DETAILED DESCRIPTION

Figure 1:
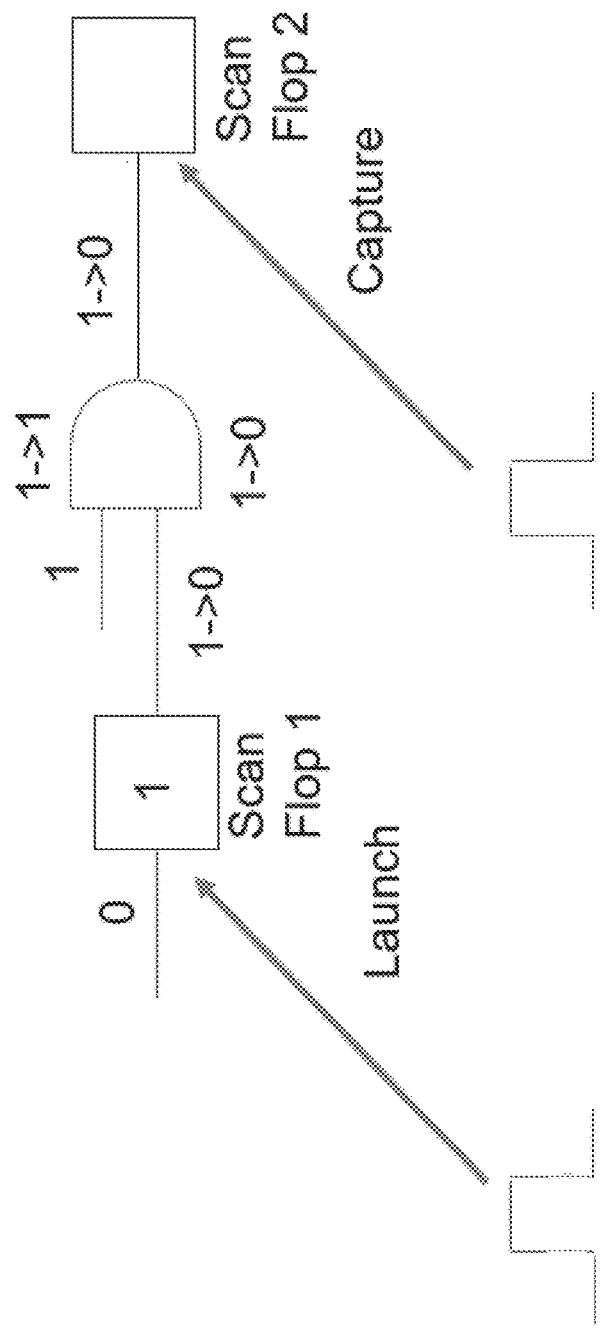
FIG. 1 is a diagram showing an example of a launch off shift approach.

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

Reference will now be made in detail to the embodiments of the present disclosure, examples of which are illustrated in the accompanying drawings. The present disclosure may, however, be embodied in many different forms and should not be construed as being limited to the embodiments set forth herein; rather, these embodiments are provided so that this disclosure will be thorough and complete, and will fully convey the concept of the present disclosure to those skilled in the art. In the drawings, the thicknesses of layers and regions may be exaggerated for clarity. Like reference numerals in the drawings may denote like elements.

As discussed above, launch off shift techniques may be used for transition fault testing (using at-speed scan testing) in SoC designs. FIG. 1 shows an example with multiple scan flip-flops having an AND gate therebetween. In operation, one or more scan chains may be loaded at a slow clock. Two clock pulses may then be applied at a functional frequency. The first clock pulse may launch a transition from one scan flop and the second clock pulse may capture the scan cell value at another scan flop at the end of the path being tested. If the circuit is operational, then the transition should propagate to the end of the path in time. If there is a transition delay, any propagation from the launch cell to the capture cell may be slow and may cause an erroneous value to be detected.

Figure 2:
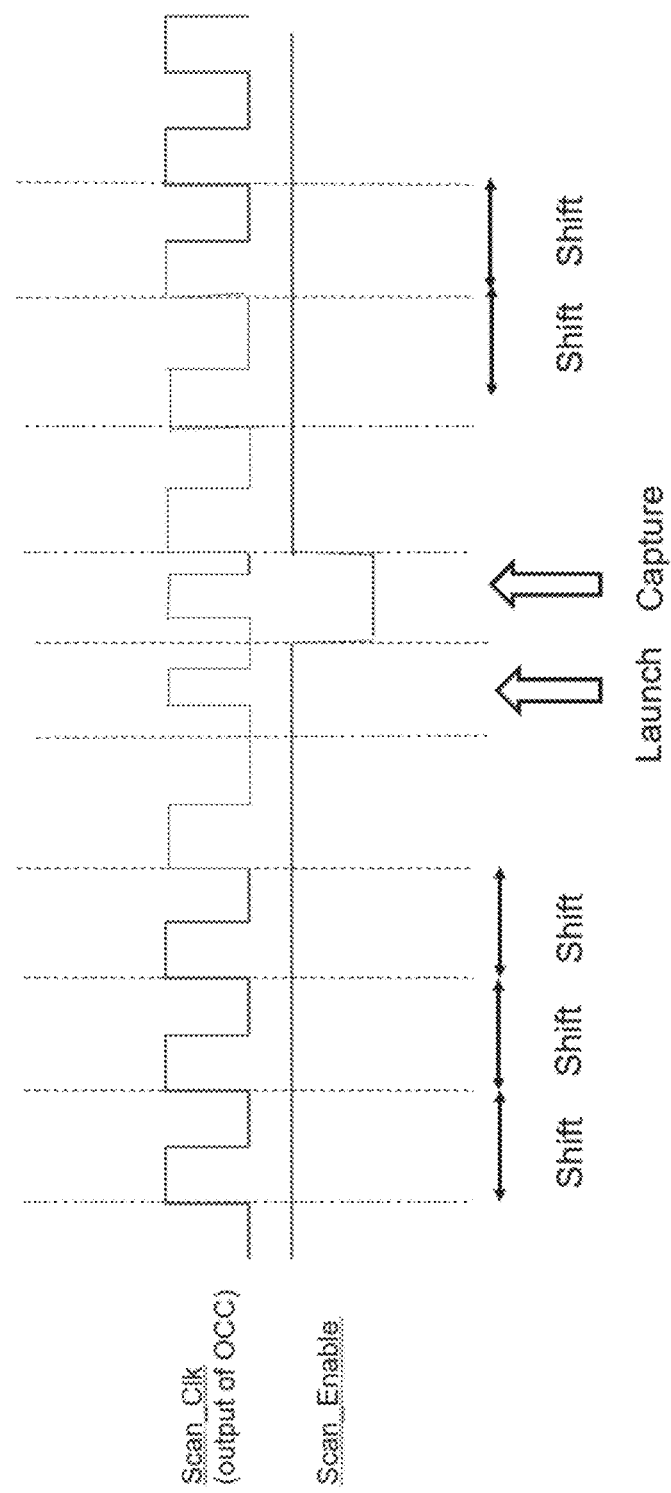
FIG. 2 is a timing diagram showing an example associated with a launch off shift approach.

Referring now to FIG. 2, a timing diagram 200 corresponding to the circuit shown in FIG. 1 is provided. In operation, at-speed launch pulse may be triggered when scan enable is active. The circuit may then be placed into the functional mode by making the scan enable low and a capture pulse may be triggered to capture the tested fault data.

Figure 3:
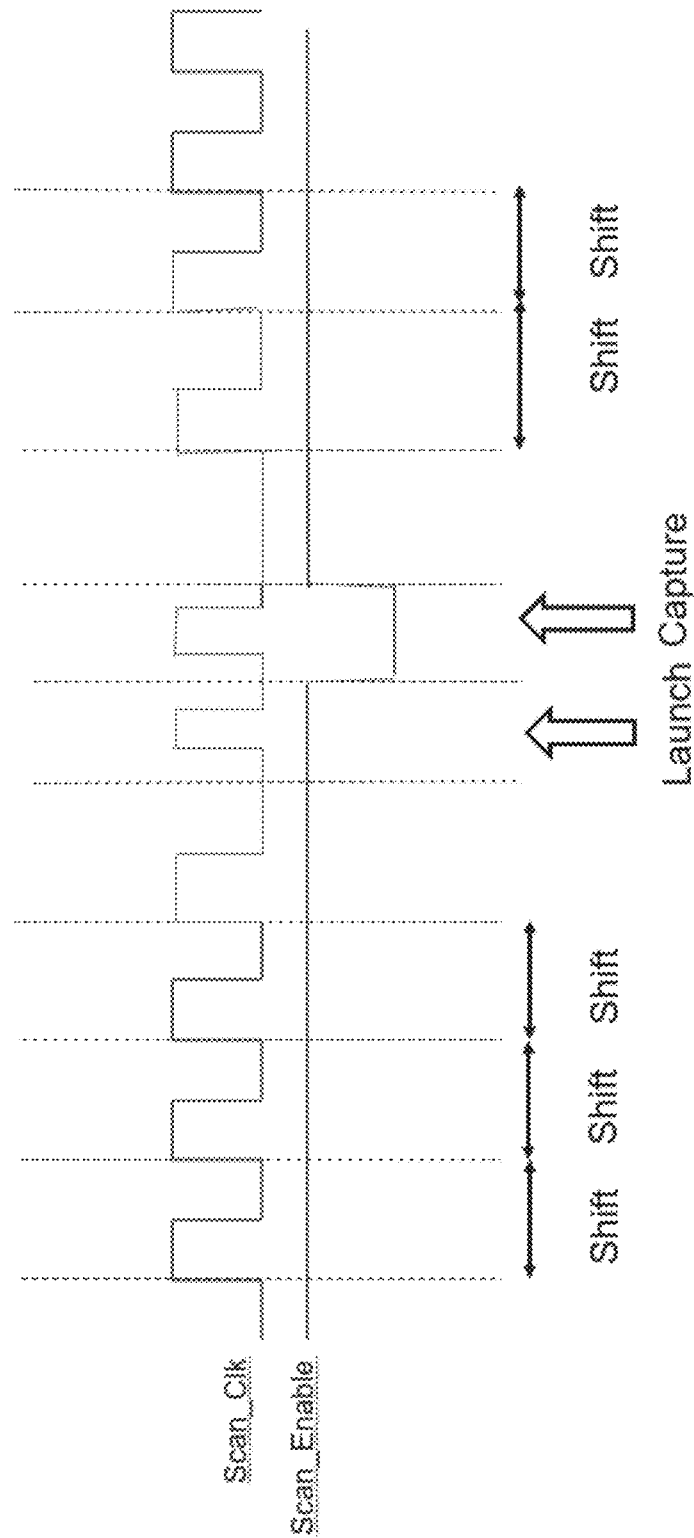
FIG. 3 is a timing diagram showing an example associated with a launch off shift approach.

Referring now to FIG. 3, a timing diagram 300 corresponding to the circuit shown in FIG. 1 is provided. It should be noted that it may be difficult to change the circuit from a shift mode to a functional mode between a launch pulse and a capture pulse. The scan enable path should meet at-speed timing requirements. In some cases, pipelining logic may be used for the scan enable as is discussed in further detail hereinbelow.

Figure 4:
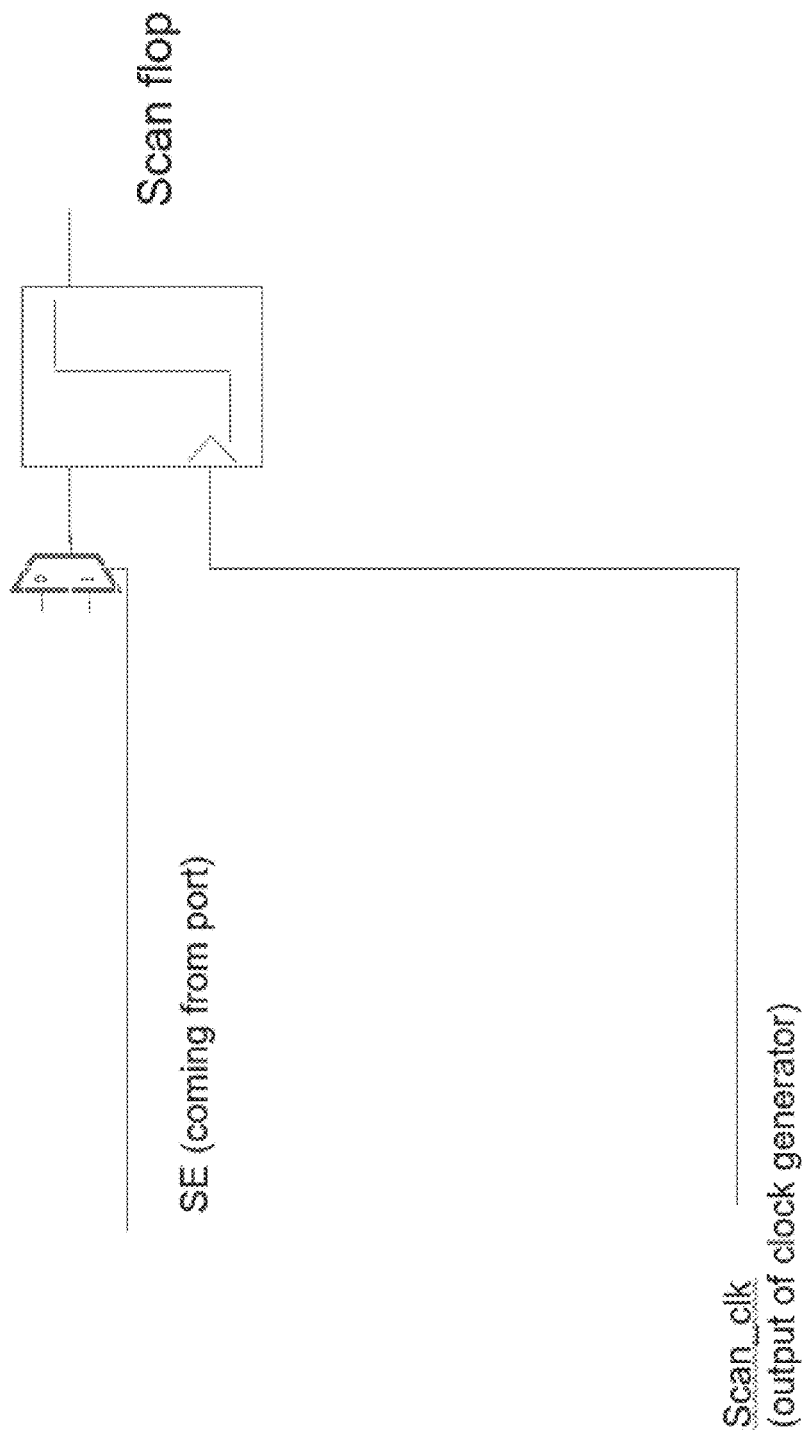
FIG. 4 is an example showing a shift enable ("SE") connection associated with a launch off shift approach.

Referring now to FIG. 4, a diagram 400 showing an example shift enable ("SE") connection without any launch off shift pipeline logic is provided. This particular example shows a non-pipelined shift enable signal being transmitted from a port to a scan flop.

Figure 5:
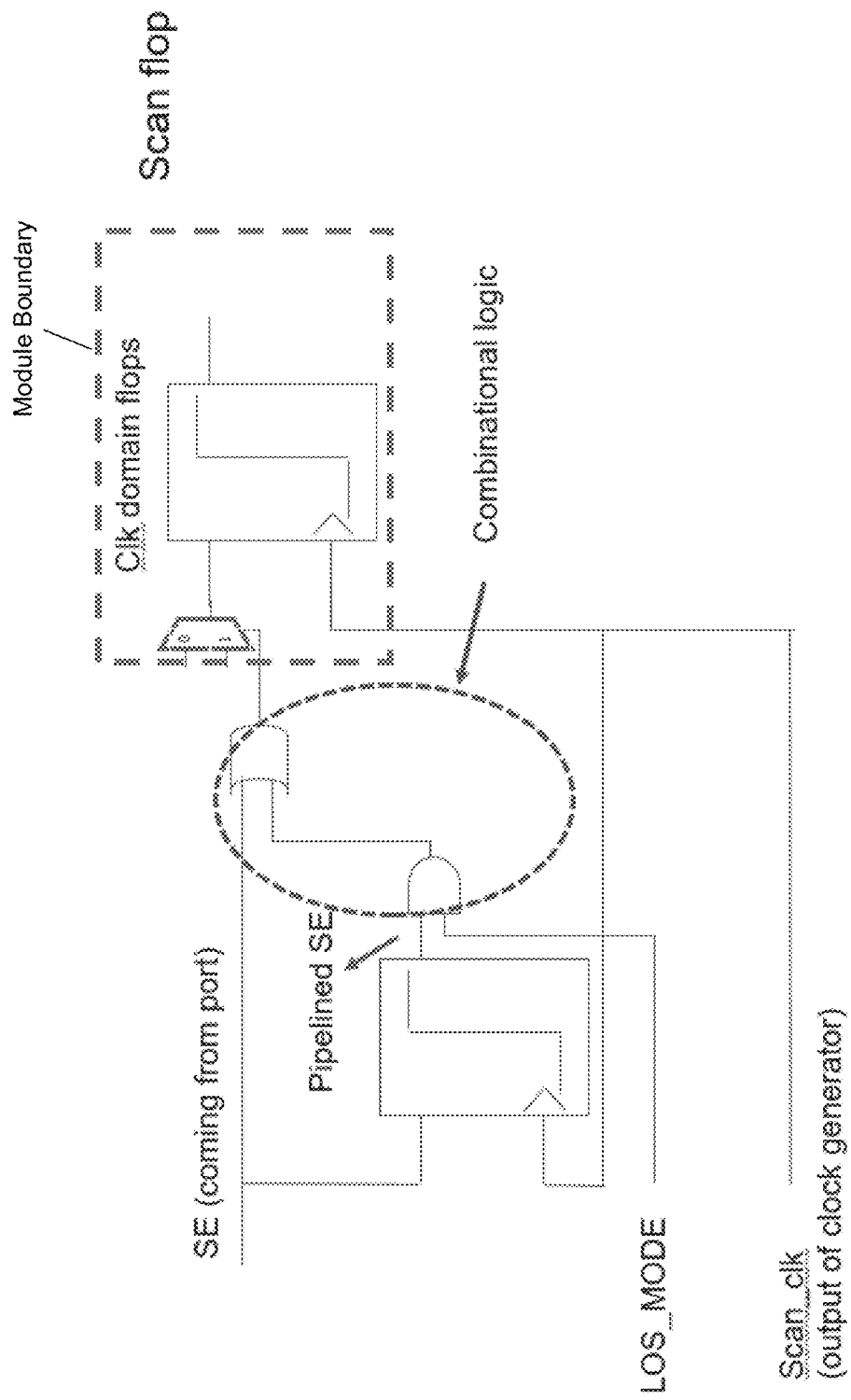
FIG. 5 is an example showing a shift enable connection associated with a launch off shift approach.

Referring now to FIG. 5, a diagram 500 showing an example shift enable ("SE") connection with launch off shift pipeline logic is provided. This particular example shows a scan enable connection after launch off shift pipeline logic is included. This example includes active high scan enable and the combinational logic is located prior to the scan flop of FIG. 4.

In existing approaches, the combinational logic is located outside the module boundary as is shown in FIG. 5. This makes the combinational logic discrete, which is difficult to copy (e.g., all of the logic as a whole) and also may lead to additional hardware requirements. In operation, it is often difficult to handle variations in shift-enable polarity at the hookup point and/or shift enable polarity associated with the scan flop. It is also difficult to handle variations in clock polarity at the hookup point and the scan flop clock polarity.

Accordingly, every module and any glue logic may need to be mapped to the proper library domain, which may increase the synthesis run-time. These techniques also make it difficult to share the same pipeline flop with scan flops triggered on the different edge i.e. positive edge ("posedge") or negative edge ("negedge") of the clock even though the net polarity is same. Embodiments of the present disclosure may address the problems associated with these existing approaches. Accordingly, an encapsulated launch off shift pipeline methodology may be implemented.

In some embodiments, encapsulated launch off shift logic may be provided, which may include all possible variations of combinational logic. Embodiments included herein may further include launch off shift pipelines for master-slave scan latches as well as clock tree tracing to minimize the launch off shift flop count. Embodiments included herein may also include approaches for power aware launch off shift insertion, the ability to reuse launch off shift modules for faster synthesis, and may also provide for launch off shift insertion command flexibility. Each of these concepts is discussed in further detail hereinbelow.

Figure 6:
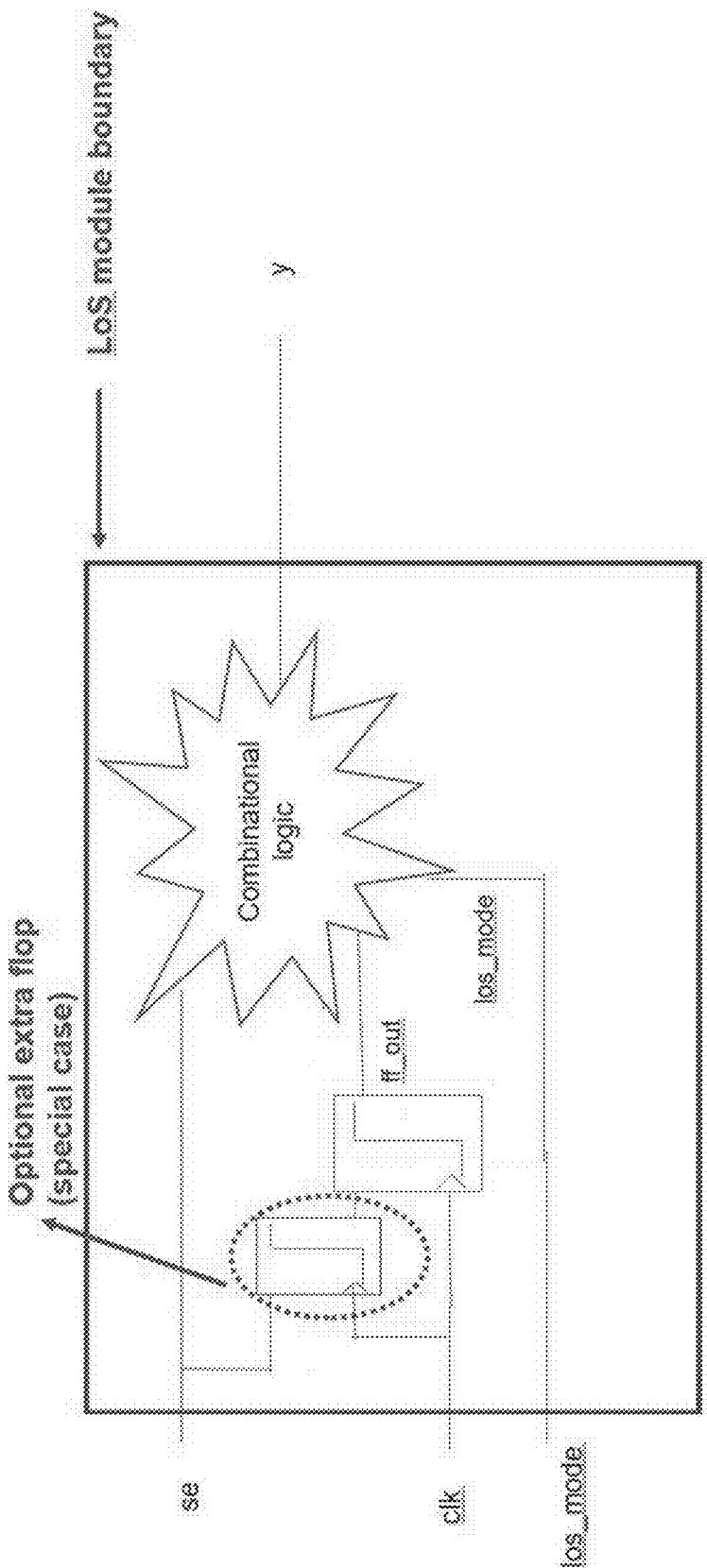
FIG. 6 is an example showing a launch off shift pipeline approach including a module boundary according to an embodiment of the present disclosure.

Referring now to FIG. 6, a block diagram 600 showing an example of launch off shift pipeline logic is provided. Diagram 600 shows a launch off shift module boundary having multiple flip-flops and combinational logic encapsulated therein. In some embodiments, all of the combinational logic may be located inside the module boundary, without any glue logic required. This configuration takes into account inversion in the shift enable path, inversion in the clock path, inversion in the launch off shift mode path, power domain of cells, library domain of cells, etc. while generating a module. This enables easy reuse of such LoS modules across the design.

In some embodiments, the encapsulation of launch off shift logic may allow for re-use of an existing module. In some cases, a new module may be synthesized only if no module of similar variations exists in the required library/power domain. This may reduce synthesis run-time. As all the above variations are being encapsulated inside the launch off shift module, the maximum count of different launch off shift modules that could exist in a design is $2^5=32$. For example, 32 combinations are possible mathematically as there are 5 variable parameters for LoS module generation (e.g., Inversion in Shift Enable path, Inversion in Clock path, Inversion in LOS mode path, Power Domain of Cells, Library Domain of Cells). Embodiments of the present disclosure may require low area overhead due to the ability to re-use combinational logic.

Referring again to FIG. 6, a number of possible variations of combinational logic may be used without departing from the scope of the present disclosure. For example, four possible cases for combinational logic are provided below by way of example in FIGS. 7-10. FIG. 7 depicts a scenario wherein 'shift enable source (se)' is active high and 'polarity of flop's se pin (y)' active high. FIG. 8 depicts a scenario wherein 'se' is active low and 'y' is active high. FIG. 9 depicts a scenario wherein 'se' is active high and 'y' is active low. FIG. 10 depicts a scenario wherein 'se' is active low and 'y' is active low. It should be noted that the combinational logic may be achieved using any suitable approach.

Referring now to FIGS. 11-16, embodiments showing examples of launch off shift pipelines for master-slave scan latches are provided. For the latest technology nodes, such as those having high frequency requirements, a user may need to add custom scan structures to meet timing at critical paths. Such scan structures need special attention for launch off shift as conventional launch off shift may not be sufficient to provide at-speed pipelining.

Figure 11:
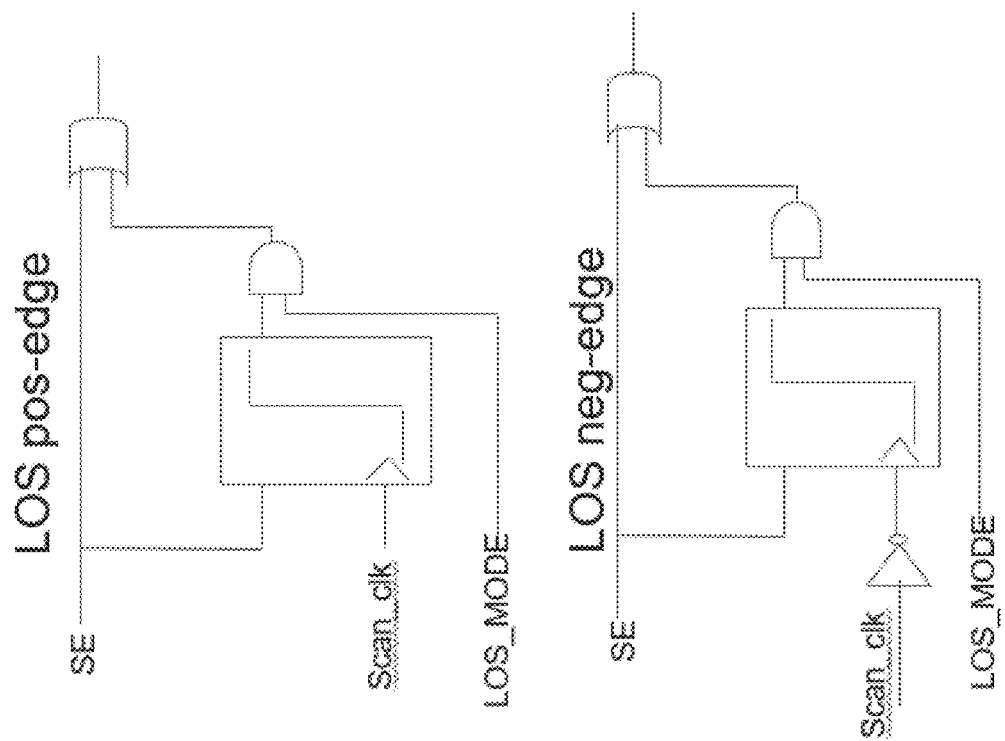
FIGS. 11-12 show an example launch off shift with scan latches according to an embodiment of the present disclosure.
Figure 12:
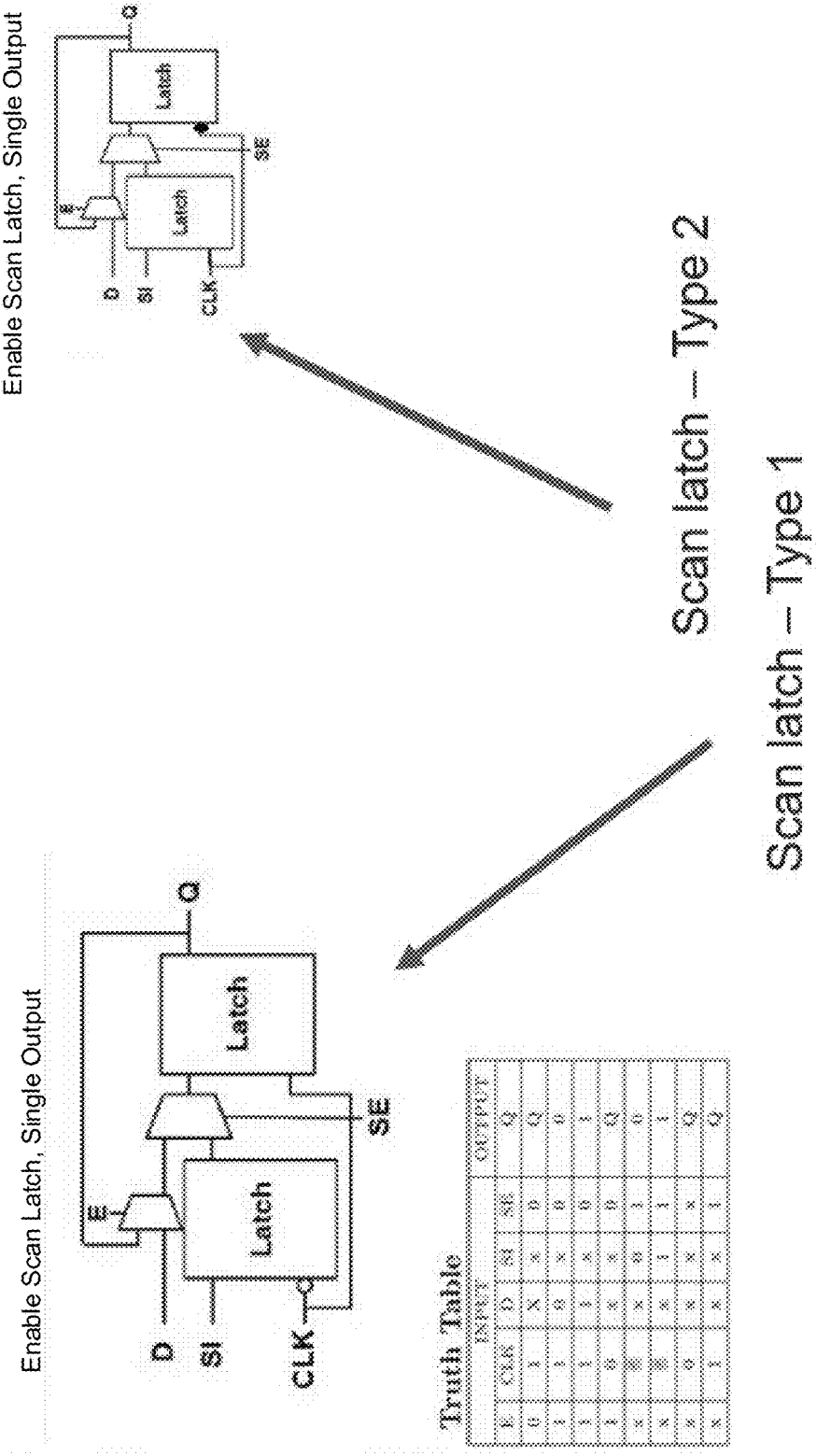
Figure 13:
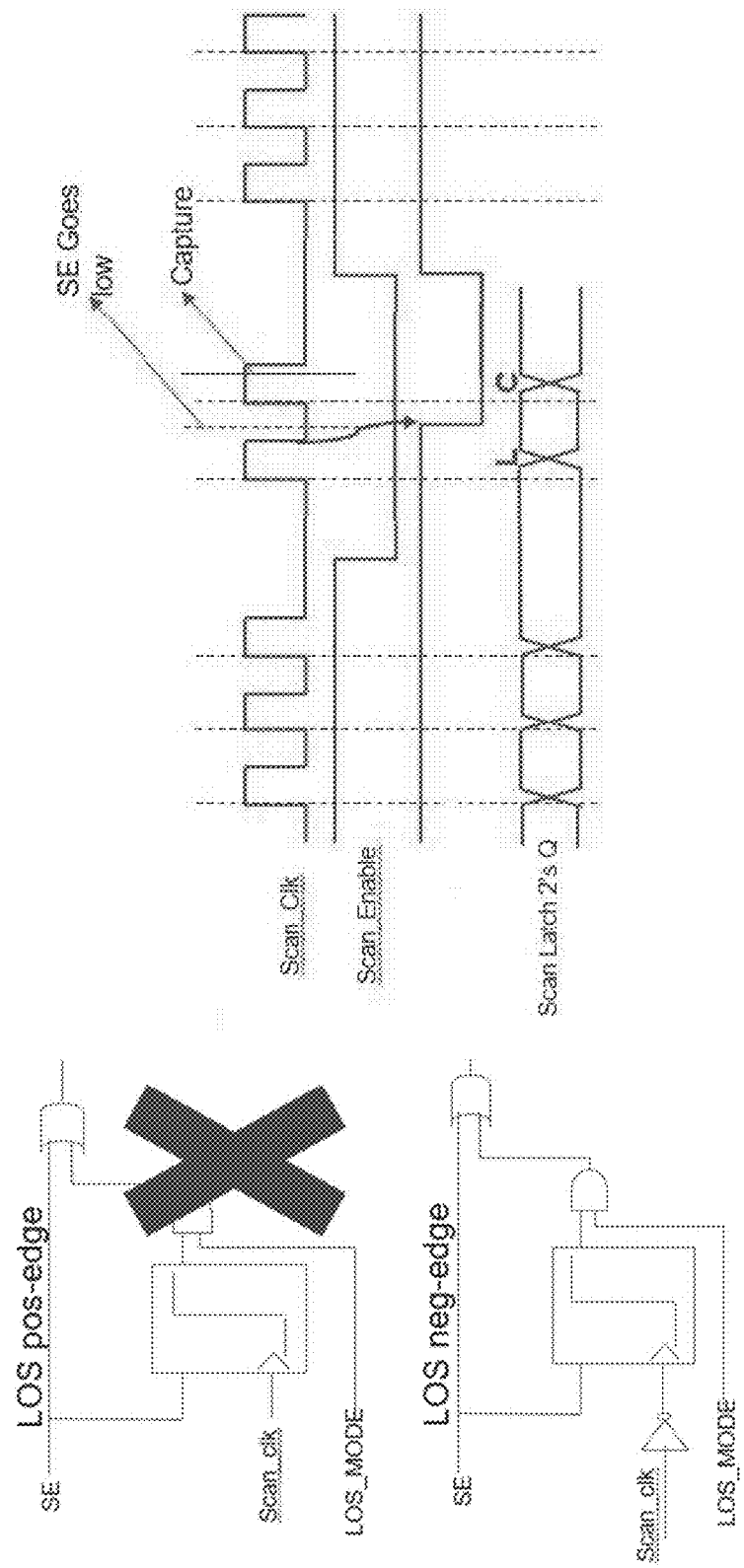
FIGS. 13-14 show an example launch off shift with scan latches according to an embodiment of the present disclosure.
Figure 14:
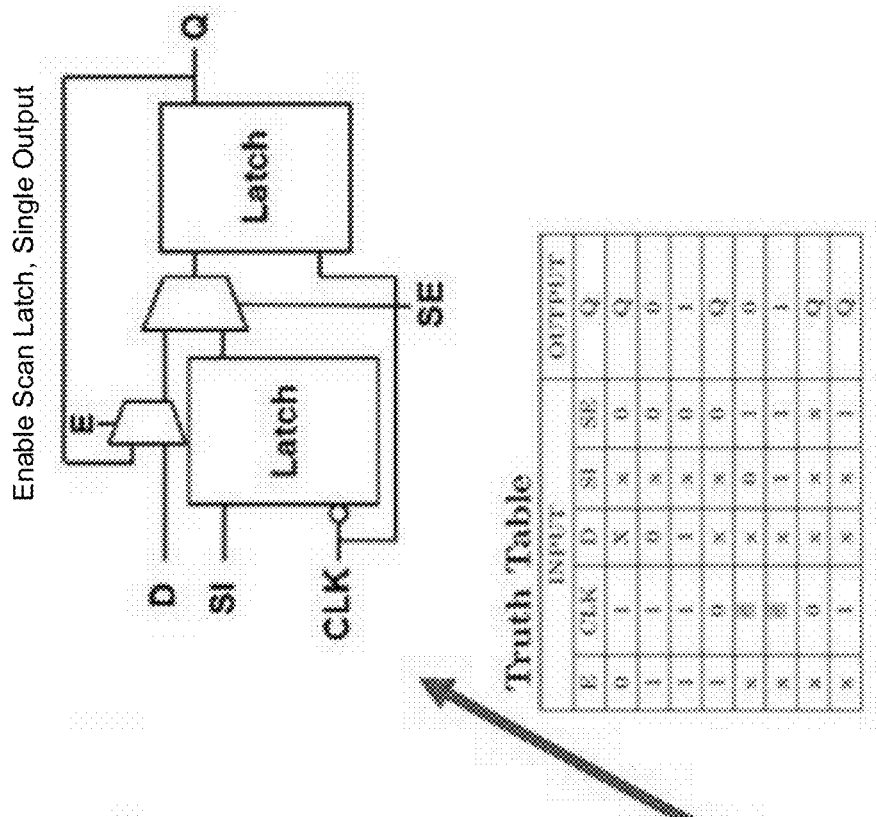
Figure 15:
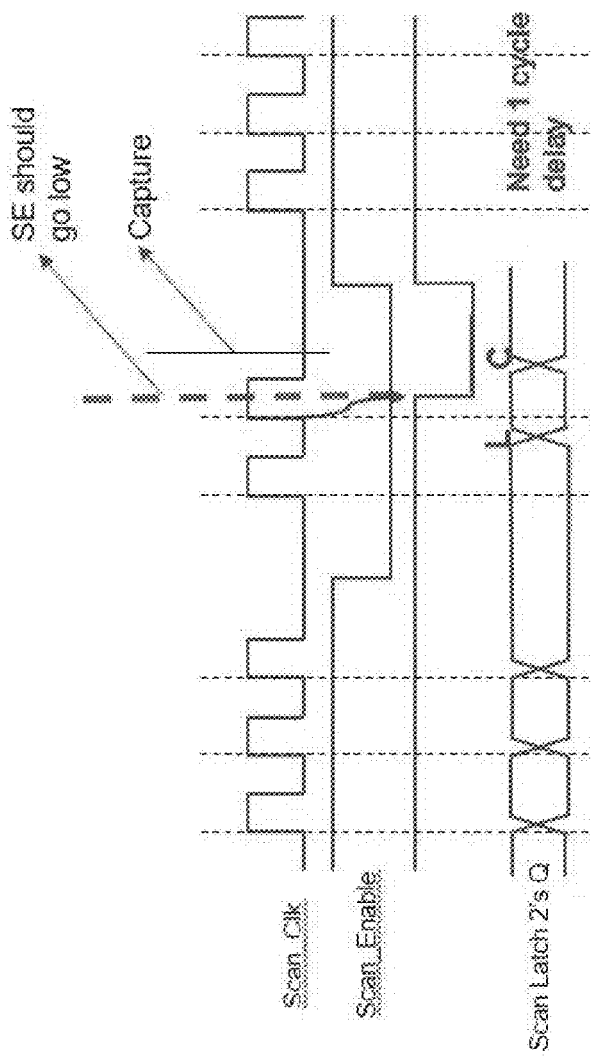
FIGS. 15-16 show example launch off shift with scan latches according to an embodiment of the present disclosure.
Figure 15:
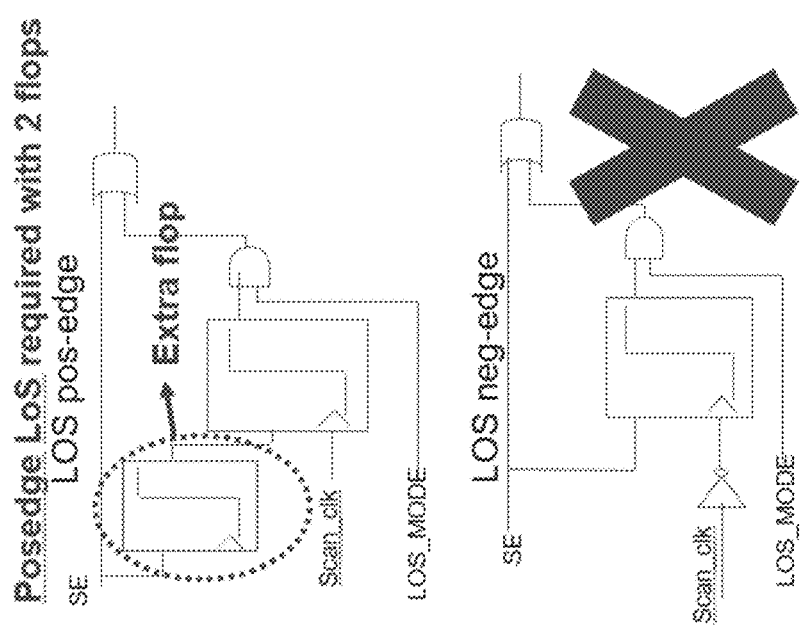
Figure 16:
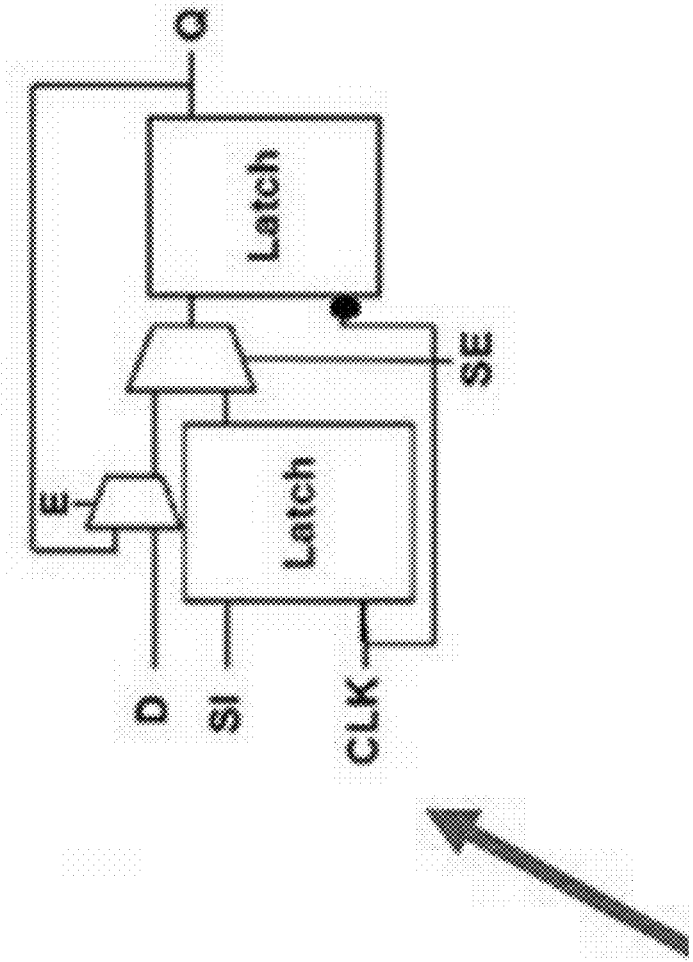

FIGS. 11-12 shows an example depicting a special scan structure that is a combination of two back-to-back latches. Embodiments included herein may be used in accordance with one or more electronic design automation applications such as those available from the Assignee of the subject application. These applications need to be configured to identify such a structure from one or more electronic design libraries and to read and insert any necessary launch off shift accordingly. Failing to insert a proper launch off shift for such custom structures could result in various issues. For example, reduced coverage as the launch pulse could come from the functional path, automatic test pattern generation ("ATPG") failures as data may propagate through a neg-→pos latch in one cycle, other ATPG failures as the path through the scan latch may be bypassed if the scan enable is not at its proper value for the launch cycle, etc. FIG. 12 shows two different types of scan latches. A determination as to which launch off shift clock edge should drive may be made. For the first type of scan latch having a negative edge D latch followed by a positive edge D latch, a special launch off shift structure may be employed. In operation, the shift enable signal at this scan latch may remain high until the negedge of the "Launch" pulse. This ensures that the positive edge D latch does not capture data from the functional path during the high time of the "Launch" pulse. This requirement may be met by inserting a launch off shift module that runs on the negative edge of the clock, which is shown in further detail in FIGS. 13-14. FIGS. 15-16 show a second type of scan latch. For this type of scan latch having a positive edge D latch followed by a negative edge D latch, a special launch off shift structure may be employed. In operation, the shift enable signal at this scan latch may remain high until the end of the "Launch" pulse. This is to ensure that the negedge D latch does not capture data from the functional path during "Launch" pulse. This requirement may be met by inserting an additional flop in the launch off shift module. Here, both the flops may run on the positive edge of the clock.

Figure 17:
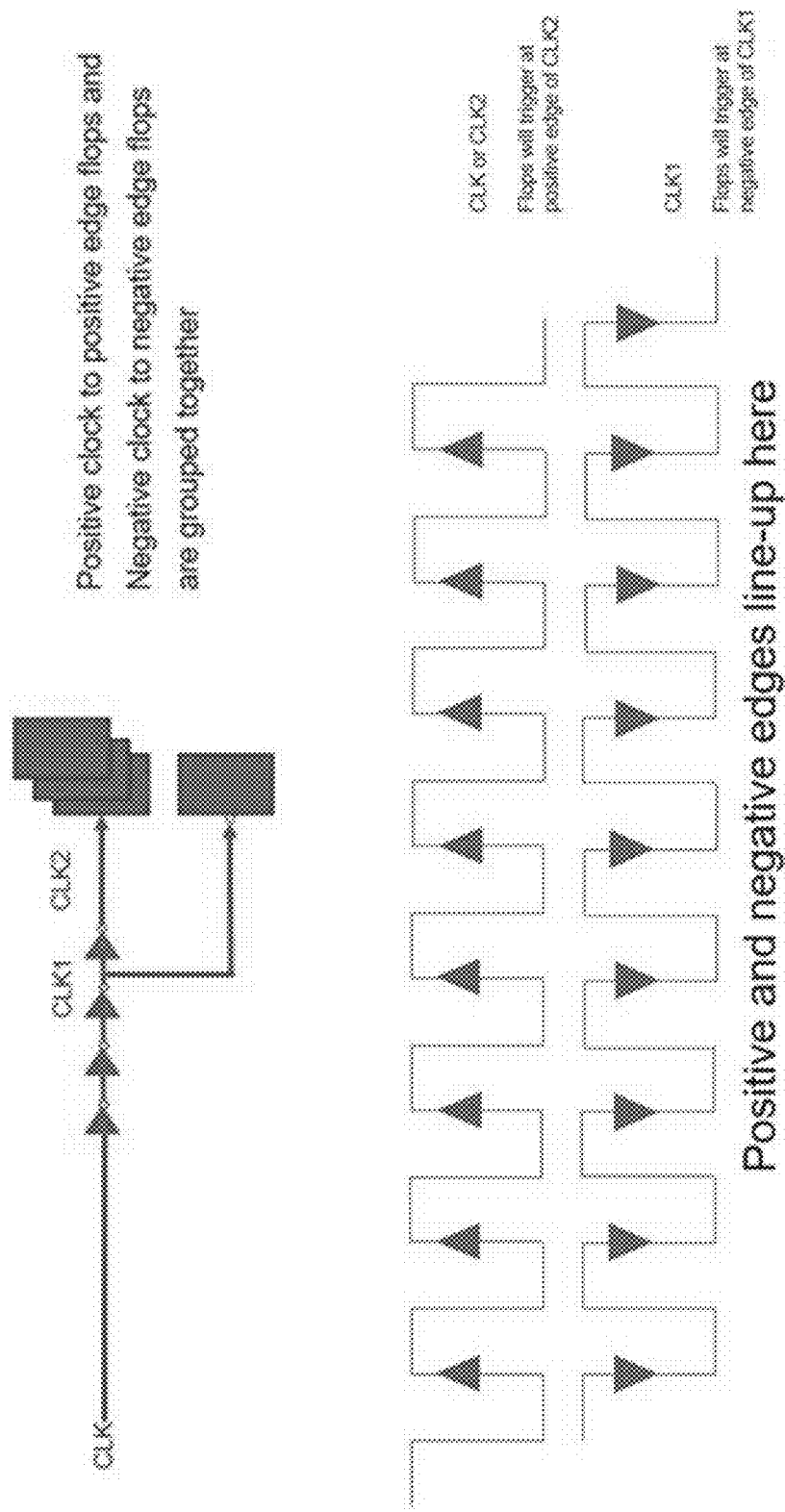
FIGS. 17-18 show example clock tree analyses according to embodiments of the present disclosure.
Figure 18:
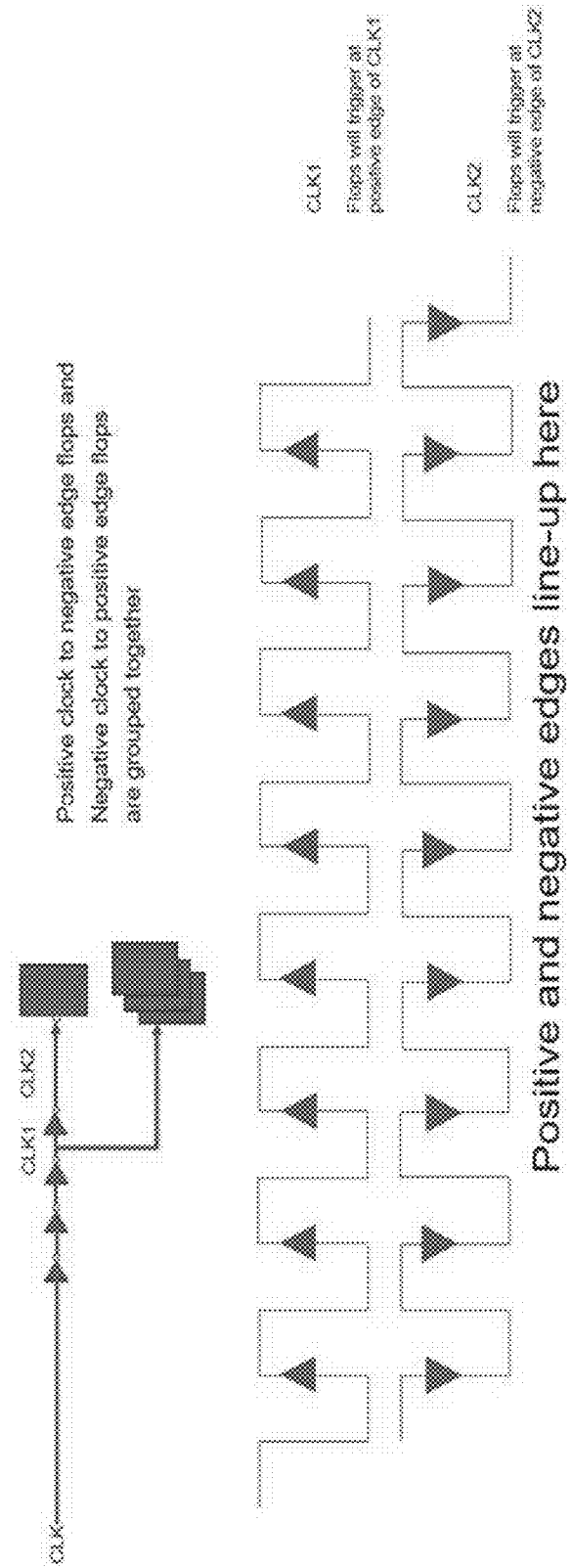

Referring now to FIGS. 17-18, embodiments showing examples of clock tree tracing to minimize launch of shift flop count are provided. In order to achieve the best timing across corners various optimization tools may perform clock buffering (e.g., by adding inverters or buffers on the clock path). This results in inverters/buffers on the clock path across hierarchies and scan cells of different polarities in the same hierarchy whose effective polarity is same. If we check only the leaf cell's clock polarity and insert a launch off shift module based on that, this results in the insertion of separate launch off shift cells for positive edge and negative edge scan elements. This results in more launch off shift cells, requiring timing to be met for each cell, as well as increased area, congestion and wirelength.

Accordingly, embodiments of the present disclosure may minimize launch off shift flops by performing smart tracing of the clock tree. In operation, an application may check for effective clock polarity of functional flops and segments for which launch off shift needs to be inserted. This may be achieved by tracing the clock tree and utilizing any inversions on the clock path. With this technique it is possible that a negedge flop shares a launch off shift flop with a posedge if an inverted clock tap point is present before the negedge flop and vice-versa. It should be noted that the launch off shift module may be the same for both the negedge and posedge flops and the clock for it may be tapped from a point where the effective polarity is the same for all the flops fed by the launch off shift module. FIGS. 17-18 show an example clock tree analysis for the launch off shift module with inverted clocks. In this example, positive clock to positive edge flip flops and negative clock to negative edge flip flops may be grouped together. A common launch off shift may be used for different flops.

Figure 19:
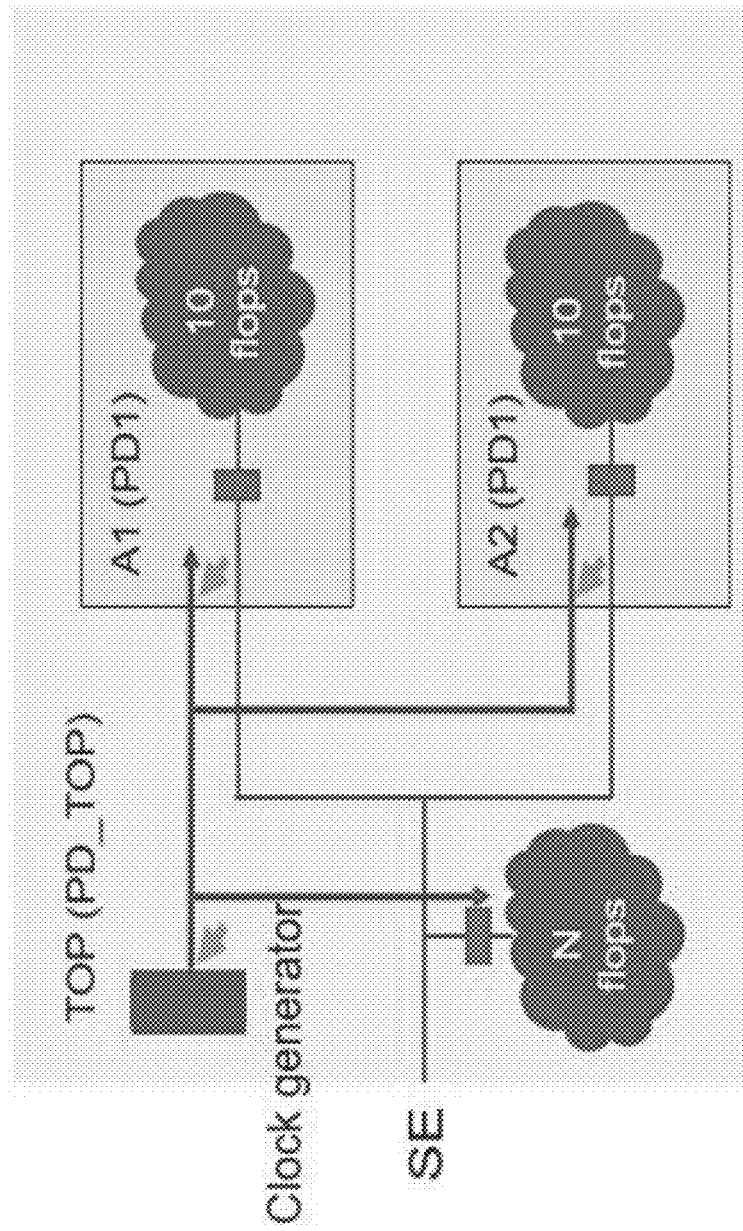
FIG. 19 shows an example of power aware launch off shift insertion according to an embodiment of the present disclosure.
Figure 20:
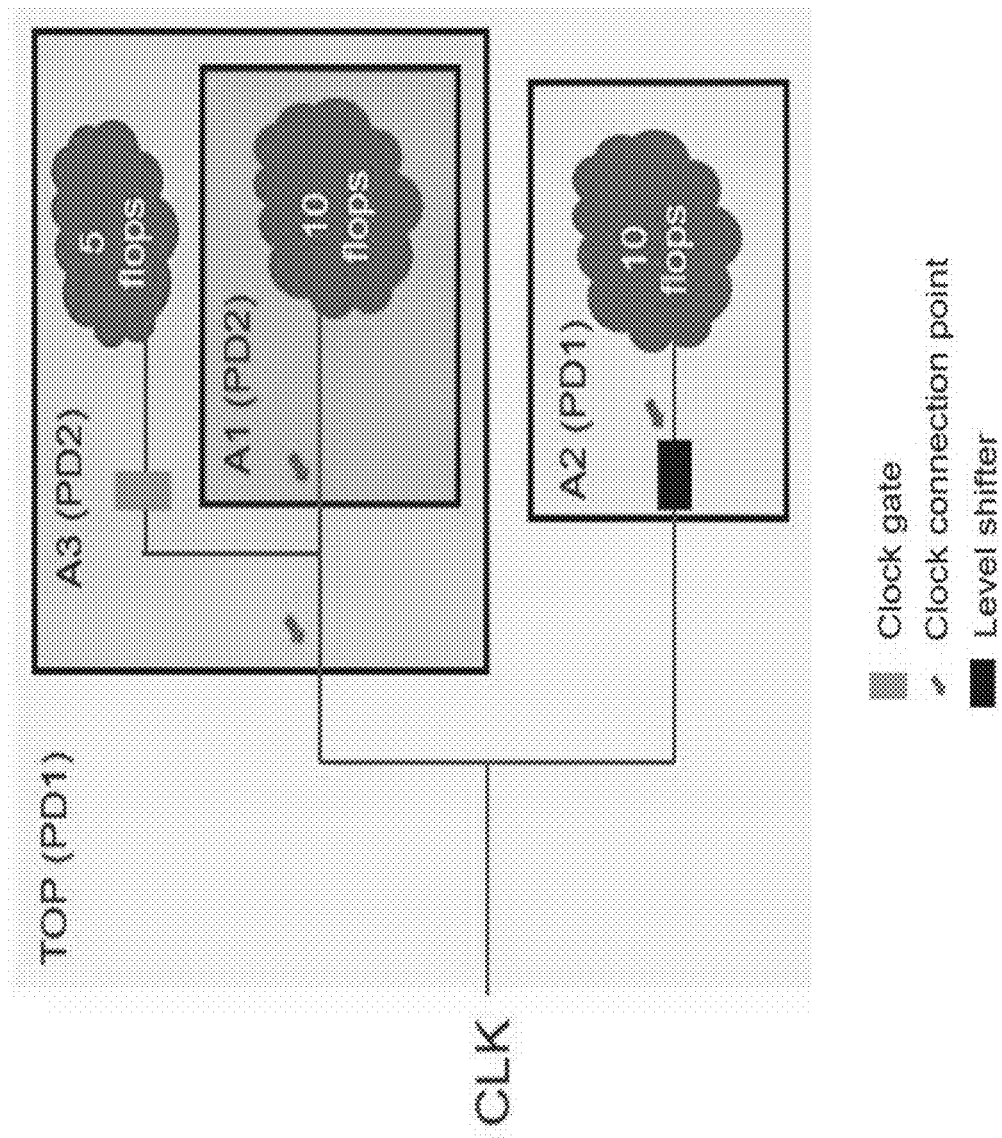
FIG. 20 shows an example of power aware launch off shift insertion according to an embodiment of the present disclosure.
Figure 21:
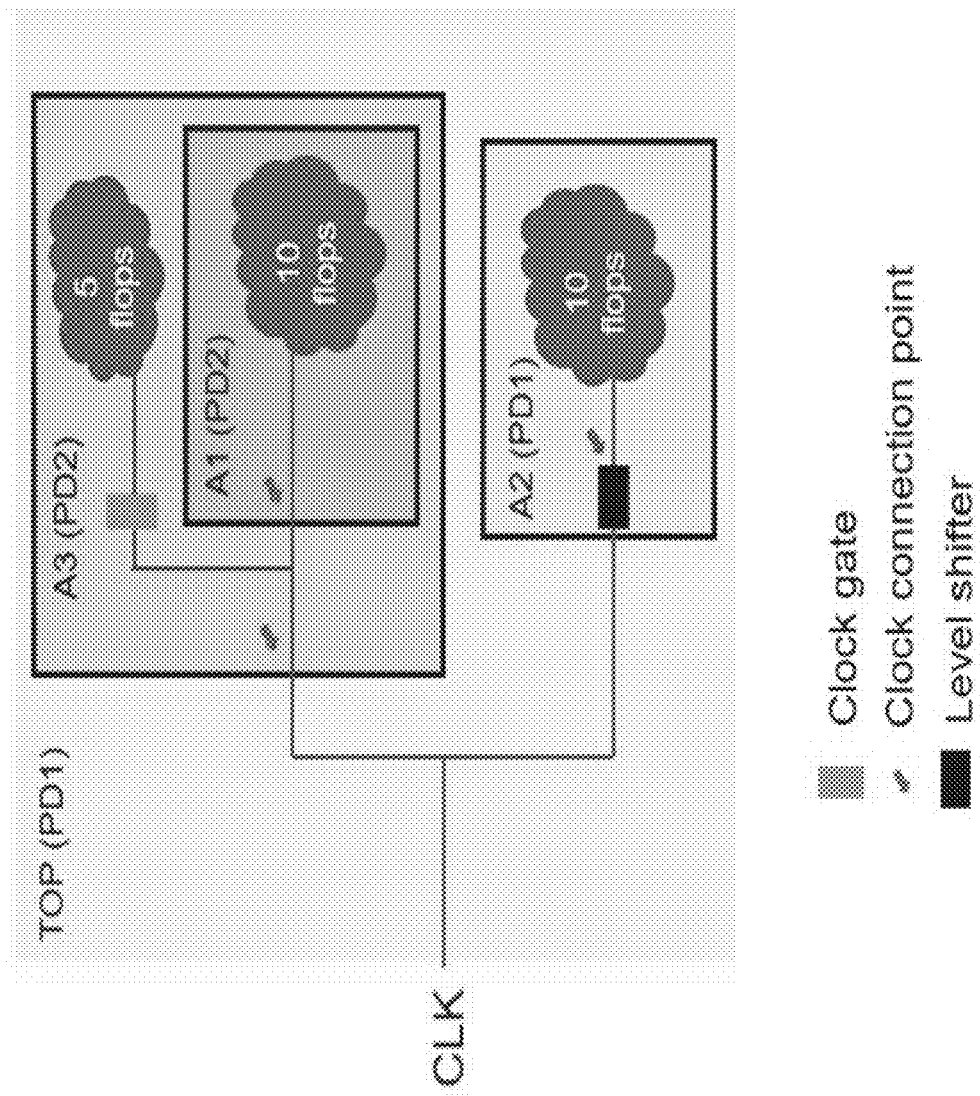
FIG. 21 shows an example of power aware launch off shift insertion according to an embodiment of the present disclosure.

Referring now to FIGS. 19-21, embodiments showing examples of power aware launch off shift insertion are provided. It should be noted that nearly all of the lower technology node designs are Institute of Electrical and Electronics Engineers ("IEEE") 1801 compliant. In some embodiments, a functional Unified Power Format ("UPF") may be read in to specify power domain information about the design. At a stage where launch off shift insertion occurs, the functional design may already have low power cells inserted based on the UPF for that design. This ensures that the design is in accordance with IEEE 1801. In operation, launch off shift insertion may be performed such that it does not create new crossings for which rules are not present in UPF. Moreover, launch off shift insertion should create minimum new crossings for which rules are present in UPF. This will lead to new low power cells added for such crossings. In contrast, if launch off shift insertion is not power aware then many power rule violations may occur that will require manual updates to UPF. In this way, a new rule may need to be written for every such crossing so that a low power cell is inserted in synthesis tool for that crossing. Writing many such rules is not a trivial task and is both time and resource intensive. This may also result in far more low power cells (e.g., level-shifters/isolation).

FIG. 19 shows a diagram 1900 showing an approach for identifying a location for power aware launch off shift insertion is provided. As discussed above, the launch off shift insertion may be power domain aware. The pipeline flop may be inserted in the same power domain as that of the associated scan flops and abstract segments. No power domains crossing may be created. Pipeline flops may be inserted inside A1, A2 and TOP for scan flops present inside domains A1 of power domain PD1, A2 of power domain PD1 and TOP of power domain PD_TOP respectively.

FIG. 20 shows a diagram 2000 showing an approach for identifying a clock tap point for power aware launch off shift insertion is provided. In some embodiments, the clock connection point for the pipeline flop may come from the level shifter, isolation logic, and/or the point where the domain boundary changes as shown below. This ensures reuse of low power cells on the clock line for launch off shift connections. This results in less low power cells and no IEEE1801 violations.

FIG. 21 shows a diagram 2100 showing an approach for identifying a scan enable tap point for power aware launch off shift insertion is provided. The shift enable connection point for the pipeline flop may also come from the level shifter, isolation logic and/or the point where the domain boundary changes.

Figure 22:
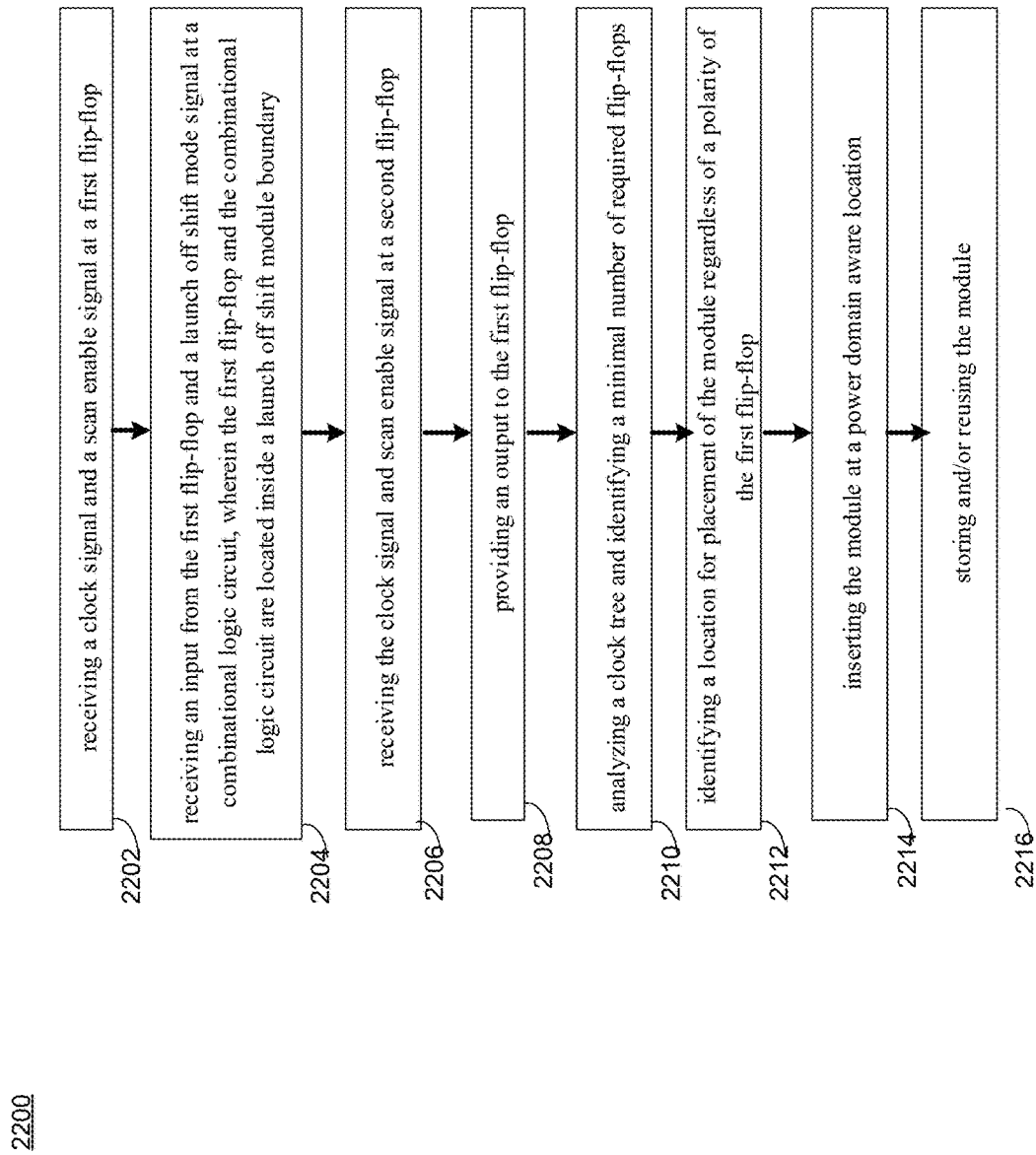
FIG. 22 shows a flowchart depicting operations of a launch off shift process according to an embodiment of the present disclosure.

Referring now to FIG. 22 a flowchart 2200 depicting operations of a launch off shift process according to an embodiment of the present disclosure is provided. The launch off shift process may include receiving 2202 a clock signal and a scan enable signal at a first flip-flop. The method may further include receiving 2204 an input from the first flip-flop and a launch off shift mode signal at combinational logic, wherein the first flip-flop and the combinational logic are located inside a launch off shift module boundary.

One or more of the following features may be included. In some embodiments, the method may include receiving 2206 the clock signal and the scan enable signal at a second flip-flop and providing 2208 an output to the first flip-flop. The method may also include analyzing 2210 a clock tree and identifying a minimal number of required flip-flops. The method may further include identifying 2212 a location for placement of the module regardless of a polarity of the first flip-flop. A common module may be used for both a positive edge flip-flop and a negative edge flip-flop. The method may include inserting 2214 the module at a power domain aware location. The power domain aware location may include a clock tap point. The power domain aware location may include a scan enable tap point. The method may also include storing 2216 the module and/or reusing the module. Numerous other operations are also within the scope of the present disclosure.

In some embodiments, the present disclosure may provide launch off shift insertion flexibility. In this way, a user may ask for flexibility requirements where they may want to place launch off shift flops in scan chains, connect different launch off shift mode signals to launch off shift modules for different clock domains, exclude certain elements from getting launch off shift pipeline, and to place a limit on how many scan elements a launch off shift pipeline may feed. All of the above requirements may be design dependent and may be influenced by technology node/frequency of operation/design complexity/ATPG coverage requirements. This may vary between users and/or designs. If such flexibility is not available with the application, the user may need to write custom scripts to achieve it. Such scripts may be error prone and are not scalable.

In some embodiments, the present disclosure may provide the user with an option to select the insertion of scannable launch off shift flops or non-scannable launch off shift flops using the same command. The launch off shift flops may be made part of scan chains if made scannable. In such cases, launch off shift insertion may occur prior to scan chain connections. If launch off shift flops are inserted after scan chain connection, then these are non-scannable and may not be included in scan chains.

Embodiments of the present disclosure provide flexibility and numerous improvements over existing approaches. Launch off shift insertion is very flexible and provides the ability to ignore user defined scan elements from getting their scan enable pipelined. Embodiments included herein may be used to associate a user defined maximum number of flops to one launch off shift flop. Embodiments also allow for the insertion of a launch off shift pipeline on different partitions (any user hierarchy) with same/different launch off shift enable signals. Embodiments also allow for the insertion of launch off shift pipelines having different clock domains with the same or different launch off shift enable signals.

It will be apparent to those skilled in the art that various modifications and variations can be made in the embodiments of the present disclosure without departing from the spirit or scope of the invention. Thus, it is intended that embodiments of the present disclosure cover the modifications and variations of this invention provided they come within the scope of the appended claims and their equivalents.

What is claimed is:

1. A launch off shift circuit module comprising:
   a first flip-flop configured to receive a clock signal and a scan enable signal;
   a combinational logic circuit configured to receive an input from the first flip-flop and a launch off shift mode signal, wherein the first flip-flop and the combinational logic circuit are located inside a launch off shift module boundary; and
   at least one module configured to analyze a clock tree and to identify a minimal number of required flip-flops.

2. The launch off shift circuit module of claim 1, further comprising:
   a second flip-flop configured to receive the clock signal and scan enable signal and to provide an output to the first flip-flop.

3. The launch off shift circuit module of claim 1, further comprising:
   at least one module configured to identify a location for placement of the module regardless of a polarity of the first flip-flop.

4. The launch off shift circuit module of claim 3, wherein a common module is used for both a positive edge flip-flop and a negative edge flip-flop.

5. The launch off shift circuit module of claim 1, wherein the module is inserted at a power domain aware location.

6. The launch off shift circuit module claim 5, wherein the power domain aware location includes a clock tap point.

7. The launch off shift circuit module of claim 5, wherein the power domain aware location includes a scan enable tap point.

8. The launch off shift circuit module claim 1, further comprising:
   a storage device configured to store the module.

9. The launch off shift circuit module claim 1, wherein the module is reusable.

10. A launch off shift method for use with a launch off shift module, comprising:
    receiving a clock signal and a scan enable signal at a first flip-flop;
    receiving an input from the first flip-flop and a launch off shift mode signal at a combinational logic circuit, wherein the first flip-flop and the combinational logic circuit are located inside a launch off shift module boundary; and
    analyzing a clock tree and identifying a minimal number of required flip-flops.

11. The launch off shift circuit method of claim 10, further comprising:
    receiving the clock signal and scan enable signal at a second flip-flop; and
    providing an output to the first flip-flop.

12. The launch off shift circuit method of claim 10, further comprising:
    identifying a location for placement of the module regardless of a polarity of the first flip-flop.

13. The launch off shift circuit method of claim 12, wherein a common module is used for both a positive edge flip-flop and a negative edge flip-flop.

14. The launch off shift circuit method of claim 10, further comprising:
    inserting the module at a power domain aware location.

15. The launch off shift circuit method claim 14, wherein the power domain aware location includes a clock tap point.

16. The launch off shift circuit method of claim 14, wherein the power domain aware location includes a scan enable tap point.

17. The launch off shift circuit method claim 10, further comprising:
    storing the module.

18. The launch off shift circuit method claim 17, further comprising:
    reusing the module.

* * * * *